(12) United States Patent
Shemer et al.

(10) Patent No.: US 12,393,441 B2
(45) Date of Patent: *Aug. 19, 2025

(54) SMARTNIC BASED VIRTUAL SPLITTER ENSURING MICROSECOND LATENCIES

(71) Applicant: EMC IP Holding Company LLC, Hopkinton, MA (US)

(72) Inventors: Jehuda Shemer, Kfar Saba (IL); Srinivas Kangyampeta, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 50 days.

This patent is subject to a terminal disclaimer.

(21) Appl. No.: 18/416,481

(22) Filed: Jan. 18, 2024

(65) Prior Publication Data

US 2024/0152383 A1    May 9, 2024

Related U.S. Application Data

(63) Continuation of application No. 17/191,130, filed on Mar. 3, 2021, now Pat. No. 11,900,140.

(51) Int. Cl.
*G06F 9/455*   (2018.01)
*G06F 3/06*    (2006.01)
*G06F 9/54*    (2006.01)

(52) U.S. Cl.
CPC ........ *G06F 9/45558* (2013.01); *G06F 3/0611* (2013.01); *G06F 3/0659* (2013.01); *G06F 3/0664* (2013.01); *G06F 3/0673* (2013.01); *G06F 9/545* (2013.01); *G06F 9/45541* (2013.01); *G06F 2009/45583* (2013.01)

(58) Field of Classification Search
CPC .................................................. G06F 9/45558
USPC ............................................................ 718/1
See application file for complete search history.

(56) References Cited

U.S. PATENT DOCUMENTS

| | | | |
|---|---|---|---|
| 8,429,362 B1* | 4/2013 | Natanzon | G06F 3/067 |
| | | | 714/6.1 |
| 9,405,765 B1* | 8/2016 | Natanzon | G06F 16/196 |
| 9,600,553 B1* | 3/2017 | Nigade | G06F 11/14 |
| 9,659,074 B1* | 5/2017 | Natanzon | G06F 9/45558 |
| 9,875,042 B1* | 1/2018 | Natanzon | G06F 11/1471 |
| 9,959,061 B1* | 5/2018 | Natanzon | G06F 3/0617 |
| 9,965,306 B1* | 5/2018 | Natanzon | G06F 11/1471 |
| 10,120,925 B1* | 11/2018 | Natanzon | G06F 16/27 |
| 10,191,687 B1* | 1/2019 | Baruch | G06F 11/14 |
| 10,235,061 B1* | 3/2019 | Natanzon | G06F 3/0689 |
| 10,235,091 B1* | 3/2019 | Ayzenberg | G06F 3/0665 |
| 10,489,058 B2* | 11/2019 | Zhao | G06F 3/0611 |
| 11,513,693 B2* | 11/2022 | Saad | H04L 67/1095 |
| 11,775,179 B2* | 10/2023 | Li | G06F 3/065 |
| | | | 714/15 |

(Continued)

*Primary Examiner* — Mehran Kamran
(74) *Attorney, Agent, or Firm* — Workman Nydegger

(57) ABSTRACT

A data protection system includes a splitter configured to reduce latencies when splitting writes in a computing environment. The splitter captures a write and adds metadata to augment the write with virtual related information. The augmented data is provided to a smartNIC while the write is then processed in the IO stack. The smartNIC may have a volume only visible to the splitter. The smartNIC also includes processing power that allows data protection operations to be performed at the smartNIC rather than with the processing resources of the host.

20 Claims, 6 Drawing Sheets

(56) References Cited

U.S. PATENT DOCUMENTS

| | | | |
|---|---|---|---|
| 2013/0198368 A1* | 8/2013 | Patterson | H04L 43/0852 |
| | | | 709/224 |
| 2019/0296990 A1* | 9/2019 | Luuppala | G06F 21/552 |
| 2020/0042619 A1* | 2/2020 | Venkataramani | H04L 67/1095 |
| 2021/0271390 A1* | 9/2021 | Shemer | G06F 3/067 |
| 2021/0271391 A1* | 9/2021 | Azaria | G06F 3/0679 |
| 2022/0113878 A1* | 4/2022 | Saad | G06F 3/067 |
| 2022/0283837 A1* | 9/2022 | Shemer | G06F 9/545 |

* cited by examiner

SMARTNIC BASED VIRTUAL SPLITTER ENSURING MICROSECOND LATENCIES

FIELD OF THE INVENTION

Embodiments of the present invention generally relate to data protection and data protection operations. More particularly, at least some embodiments of the invention relate to systems, hardware, software, computer-readable media, and methods for data protection operations including splitting operations.

BACKGROUND

Data protection is an important aspect of computing systems. Data protection can be complicated because computing systems can be configured in many different manners. Implementing data protection in one system may differ from implementing data protection in another system. For example, many systems may implement multiple standards such as small computer system interface (SCSI). A data protection system configured to accommodate SCSI protocols may not have the same performance in a different situation or in a system using different protocols or standards. The differences can impact the performance of the production system itself and the performance of the data protection system.

For example, backing up a virtual machine including the virtual disks (e.g., virtual device disk file (VMDK)) of the virtual machines is different from backing up a physical disk. As different or newer protocols are introduced and adopted, the ability to provide data protection may be adversely impacted by these technologies. For example, advances in technology are often accompanied by increases in speed and performance. Unfortunately, when faster technologies are introduced, the mechanisms of existing data protection systems may not be able to keep up and, as a result, the benefits of the faster speeds may be lost from a data protection perspective. In addition, the ability of the data protection system to keep pace with the data being generated and stored in storage devices or a production system can be compromised.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1A:
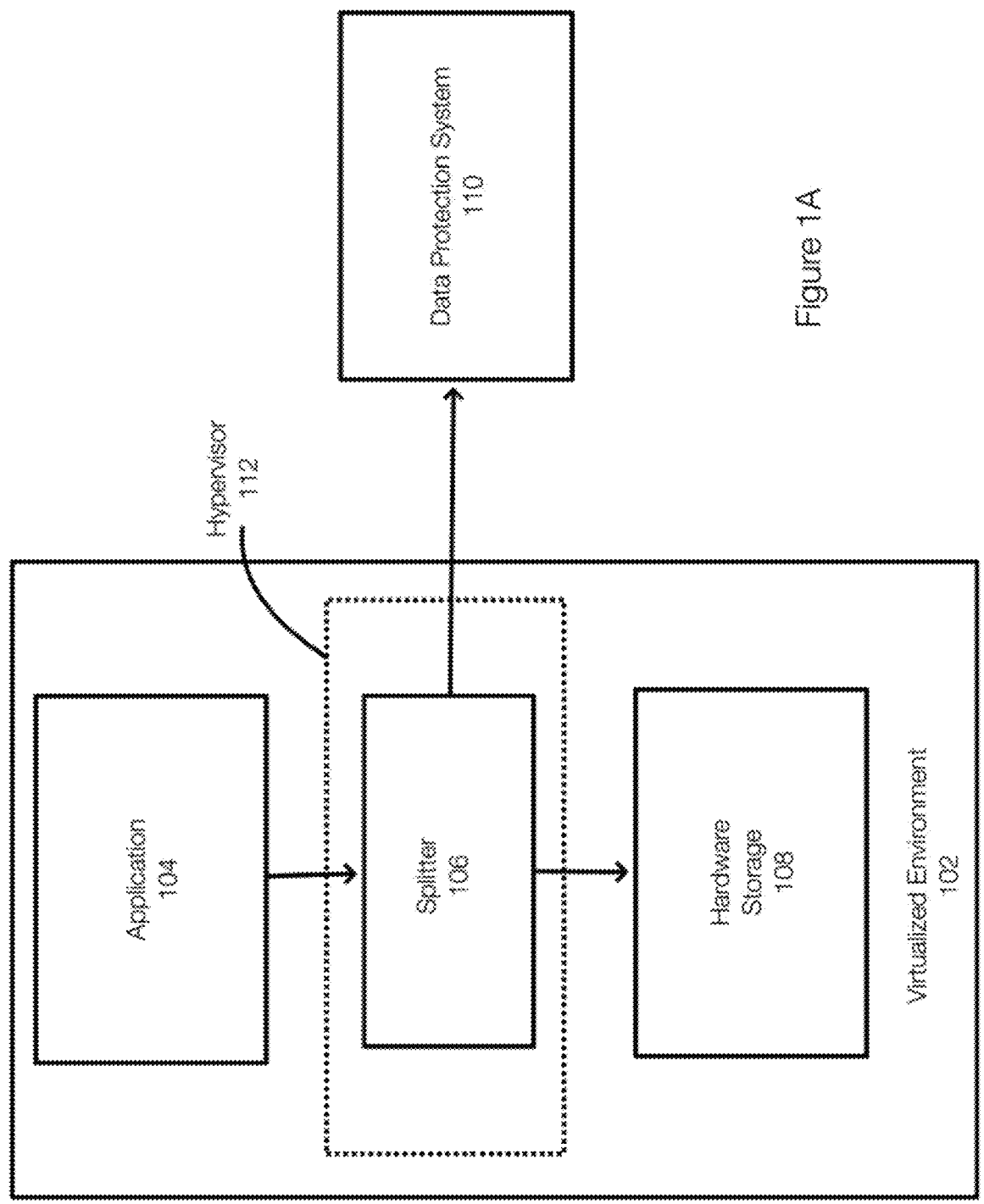
FIG. 1A discloses aspects of a virtualized environment that includes a splitter associated with a data protection system.

Embodiments of the present invention generally relate to data protection. More particularly, at least some embodiments of the invention relate to systems, hardware, software, computer-readable media, and methods for data protection operations including backup operations, restore operations, splitting operations, replication operations, plugin operations, stack operations, compression operations, de-duplication operations, or the like or combination thereof.

Embodiments of the invention are discussed with reference to certain protocols or standards such as NVMe (Non-Volatile Memory Express), and SCSI (Small Computer System Interface). However, embodiments of the invention, with the benefit of the present disclosure, are applicable to and can be implemented with respect to other protocols and standards. Embodiments of the invention can be implemented in various environments including virtualized environments running virtual machines and containerized environments running containers.

Embodiments of the invention relate to a data protection system that includes or is associated with a splitter. Embodiments of the invention more specifically relate to the splitter. Generally, the splitter is configured replicate or copy writes (e.g., IOs (Input/Outputs) generated by an application) to another location. Thus, writes are intercepted or split by the splitter and copies of the writes are sent to a data protection system while the original writes are written to their intended destinations in production storage of the production system. Splitters are often used to implement business continuity and disaster recovery systems. Splitting the data may allow an entity to failover to a backup with minimal loss of time and/or data.

A splitter (or portion thereof) may also perform other operations including discovering the storage associated with an application, handling connectivity issues, and the like. A splitter is typically implemented in the IO path, such as in the IO stack, in a switch, in the storage server, or the like. When operating in a virtual environment, the splitter is typically implemented in the hypervisor. When operating in a containerized environment, the splitter may be placed in an appropriate layer (e.g., a container manager layer) of the containerized architecture. Further, the splitter may have different components implemented in different location.

For example, in a virtualized environment such as VMware ESX hypervisor, the unit of storage that is being managed or backed up may be a virtual machine disk (VMDK). When splitting a write, the splitter and the data protection system needs to understand which virtual machine disk is the destination of the write rather than the universal ID (UID) in part because virtual machines are being backed up. For example, multiple VMDKs may be placed on the same datastore/device. When protecting virtual devices such as VMDKs, the IO information (e.g., address, length) should be at the VMDK level and not ad the datastore level. The address used, in embodiments of the invention, is available in the stack before the virtualizations layers transform the address to the real physical device.

Thus, the information or metadata that allows the correct VMDK to be identified is available in the hypervisor. By implementing the splitter in the hypervisor, the virtual machine disk metadata can be obtained as associated with the write before the write is fully converted to a physical address. In one embodiment, to identify and replicate (split) the write, the splitter thus has a presence in hypervisor at least because it is difficult to recognize the VMDKs associated with a specific virtual machine (VM) outside of the hypervisor or IO stack in the context of a storage view.

A splitter splits the writes from an application to a data protection system (e.g., an RPA—RecoverPoint Appliance) over a network. However, if the production storage is much faster than the replication to the data protection system, performance degradations may occur. Embodiments of the invention overcome latencies associated with splitting the write IOs over a network, which latencies may include the time needed for the write to be sent to the data protection system and acknowledged back to the splitter.

Embodiments of the invention thus relate to a splitter that can overcome the detrimental impact of these latencies and accommodate storage protocols such as NVMe in addition to other storage protocols such as SCSI. NVMe, for example, is typically designed for a non-volatile class of storage that overcomes the multi-layer queuing and serialized mechanism of the legacy SCSI protocol. NVMe is designed for multicore systems and theoretically supports up to 64K queues per storage device. This decreases the latencies of the IO from the milliseconds range of SCSI to microseconds for NVMe. Embodiments of the invention thus relate to a data protection system including a splitter that can effectively perform splitting operations while reducing or minimizing performance impacts on the primary computing system including computing systems that implement NVMe.

The splitter, in one embodiment, is implemented in a distributed manner. Different aspects of the splitter are implemented at different locations in the IO path or IO stack. For example, one portion may be implemented in a hypervisor and another portion may be implemented in a SmartNIC (Smart Network Interface Card). SmartNICs provide additional CPU and memory resources so that some of the CPU intensive tasks related to network and storage traffic can be offloaded to the SmartNIC. The offload engines in the SmartNIC can be either hardware FPGA based, or software based. Implementing aspects of data protection operations in the SmartNIC reduces the latencies. For example, moving CPU intensive tasks like encryption and compression of network/storage from the host CPU to the SmartNIC frees the main CPU to benefit the application which need to run on the host. Further, acknowledgements can be performed quickly because various aspects of the splitting operations are performed within the IO stack.

In order to reduce latencies, embodiments of the invention provide mechanisms for splitting writes while retaining knowledge of the source VMDK. This is useful, for example, in the context of virtualized environments with NVMe infrastructure. More generally, embodiments of the invention provide mechanisms for splitting writes while minimizing the impact of splitting or replication on the operation of the host or production system. For example, an NVMe based system may have latencies in the microsecond range and embodiments of the invention integrate a splitter with such as system such that the splitting or replication does not introduce excessive latencies (e.g., in the range of milliseconds).

FIG. 1A illustrates an example of a virtualized environment in which data protection operations including splitting operations may be performed. FIG. 1A illustrates a virtualized environment 102 (e.g., VMware ESX), but embodiments of the invention could also be implemented in other environments including containerized environments.

As illustrated in FIG. 1A, an application 104 (e.g., operating on a virtual machine) may generate writes. The writes are directed to a storage device such as hardware 108. When the writes are generated, the application 104 generates writes to a VMDK. As the writes proceed along a write path and are processed by various layers of an IO stack, the writes are essentially converted or translated from a virtual form to a physical form. More specifically, the write to a virtual disk is translated to a write to a physical disk in the IO stack. As a result of this translation, the writes are ultimately written to a physical location and the virtual information may not be available in all layers of the IO path.

Generally, the splitter 106 intercepts the write and sends a copy of the write to a data protection system 110 (e.g., DELL RecoverPoint Appliance (virtual or physical)). Thus, the splitter 106 ensures that writes from the application 104 are transmitted over a network (wired and/or wireless) to the data protection system 110. The data protection system 110 may transmit the writes received from the splitter 106 to a cloud storage in some embodiments. The data protection system 110 may, alternatively, be cloud based. The data protection system 110 (and/or the splitter 106) may also perform other operations such as compression, de-duplication, batching, or the like.

As previously discussed, however, transmitting the writes to the data protection system 110 may introduce latencies. This may be satisfactory when latencies for the write to the storage 108 are about the same as latencies to the data protection system 110.

However, when latencies to the storage 108 are much shorter (e.g., microseconds), the latencies from the splitter 106 to the data protection system 110 (e.g., milliseconds) can degrade performance. Embodiments of the splitter 106 shown in FIG. 1A overcome these latencies. More specifically, the splitter 106 is configured to reduce these latencies to support faster speeds and support multiple standards or protocols such as NVMe, SCSI, and environments such as virtual environments and containerized environments.

In FIG. 1A, the splitter 106 can be present in or implemented in one or more locations including the IO stack of the host system or environment, the hypervisor (e.g., the hypervisor 112) or virtual machine manager, in a switch, or in a storage server.

In this example, the splitter 106 is implemented in the hypervisor 112 at least because of the ability to identify information about the VMDK associated with the writes while the writes are being passed through the hypervisor 112. In one embodiment, backups may be performed to backup virtual machines including VMDKs. As a result, the splitter 106 may be implemented in the hypervisor at least because of the ability to identify the relevant VMDKs and to identify VMDK metadata.

Figure 1B:
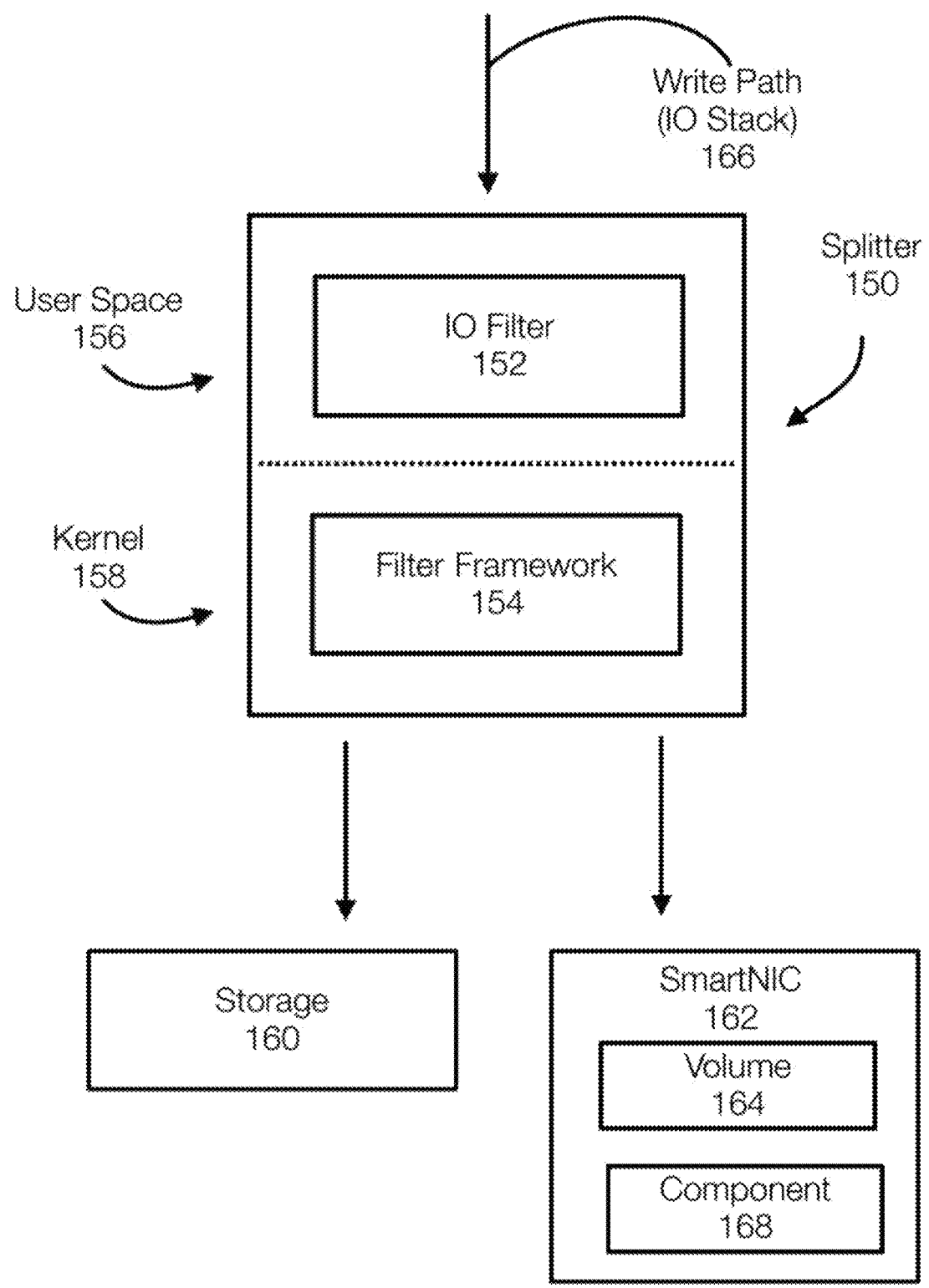
FIG. 1B discloses aspects of a splitter implemented in a hypervisor of a virtualized environment.

FIG. 1B illustrates an example of a splitter that may be implemented in a computing environment. In FIG. 1B, the splitter 150 may be implemented in a hypervisor and may be part of or implemented in a write path 166 through an IO stack. The splitter 150 may be implemented in a user space 156 and/or a kernel space 158.

FIG. 1B illustrates that the splitter 150 may include an IO filter 152 in the user space 156 and a filter framework 154 in the kernel 158. The splitter 150 may also have a component 168, which may be associated with a volume 164, implemented in a smartNIC 162. The splitter 150 (e.g., IO filter 152, filter framework 154, splitter component 168, and/or volume 164) cooperate to split writes from applications and to minimize or reduce any impact of splitting the writes on the performance of writes directed to the storage 160. In some examples, much of the splitting is performed within the write path or IO stack 166 such that latencies are reduced or minimized.

In one example, the filter framework 154 may provide a plugin framework. Thus, the IO filter 152 may plugin to the filter framework 154. When a write is received at the filter framework 154, the write filter 152 may be invoked. More specifically, the framework 154 allows other plugins or filters to be developed and used. This allows the IO filter 152 to be placed in different locations in the write IO path 166, in different places in the hypervisor, or the like.

During operation, a write may reach or be intercepted by the filter framework 154. At this stage of the IO path, the write is still in the virtual world. The write is then sent to the IO filter 152, which may be in the user space 156, and the IO filter 152 may add metadata to the write. The metadata added ensures the virtual machine, application, virtual disk, or the like is properly identified.

More specifically, the metadata address includes information related to the write offset. For example, a write may be sent to VMDK 7 to offset 12 (e.g., in blocks) and has a size of 4 blocks. When the write reaches the smartNIC 162, the address will have been translated to the address on the datastore (e.g., datastore 17, offset 2008, and size 4 blocks). The size usually stays the same unless the write is divided into pieces. Embodiments of the invention need the virtual address of VMDK 12, offset 12 in order to send the write to the data protection appliance because the data protection appliance is protecting virtual entities (e.g., VMs and VMDKs). Thus, the IO filter adds metadata such as VMDK, offset, and/or size, which information is available before the virtual address to a VMDK is translated to a physical address to a datastore or storage device.

The IO filter 152 thus generates an augmented write. The augmented write is then transmitted to the smartNIC 162 without further processing in the IO path or IO stack. The write is also transmitted to the filter framework 154 and the write then proceeds through the rest of the IO stack to the storage 160. During this process, the VMDK information is translated into a physical address as previously stated.

Because the splitting operations performed by the filter framework 154 and the IO filter 152 occur in the write path 166 or IO stack, the operations are performed quickly and latencies are substantially reduced or minimized if not eliminated.

The volume 164 implemented at the smartNIC 162 is exposed and visible to the splitter 150, but not to any application. The augmented write is directed to the volume 164. Once the augmented write is stored on the volume 164, the smartNIC 164 can use its computing resources to perform additional processing such as deduplication, compression, encryption, batching, or the like. The smartNIC 162 can then transmit to a data protection system such as an RPA. The latencies from the smartNIC 162 to the data protection system may not impact the performance of the storage system.

Thus, to achieve lower latencies for the application writes, FIG. 1B illustrates a general architecture for the splitter 150. The IO filter 152 within the filter framework 154 forwards writes to the smartNIC 164 without further processing. In addition to forwarding the writes, the IO filter 152 may capture VMDK information (e.g., metadata only in one embodiment) and send the captured information to the smartNIC 162. Thus, the smartNIC 162 or the component 168 receives and stores an augmented write in the volume 164.

The splitter component 168 may process the writes and manage communications between the splitter 150 and a data protection system such as an RPA. The component 168 operating on the smartNIC 162 may cache the writes, retain information of the source VMDK, perform compression, deduplication, and encryption as directed by the data protection system.

The component 168, in one example, exposes the volume 164 with a fake UID (not used for production storage) to the IO filter 152. As previously stated, the volume 164 is not visible to applications and may be managed by the framework 154 or other splitter components or the smartNIC 162.

As previously stated, the intercepted writes are augmented with information about the source VMDK such that the component 168 can identify the source VMDK of the writes and the virtual offset of the writes and/or the sizes of the writes.

The architecture of the splitter 150 illustrated in FIG. 1B can advantageously reduce latency for application writes. The IO filter 152 (and/or the filter framework 152) split writes and send a copy to the component 168, which can quickly acknowledge the received writes back to the IO filter 152 through the write path 166. Once the write is acknowledged, the write is then transmitted to the storage 160 through the IO stack. Because this occurs in the host IO stack rather than over a network, latency is in the microsecond range rather than the millisecond range. In one example, the split write can still be sent over the wire to the data protection system directly from the IO Filter. If transmitted using NVMe transport, which is faster than network IP transport, latency can still be reduced.

Figure 2:
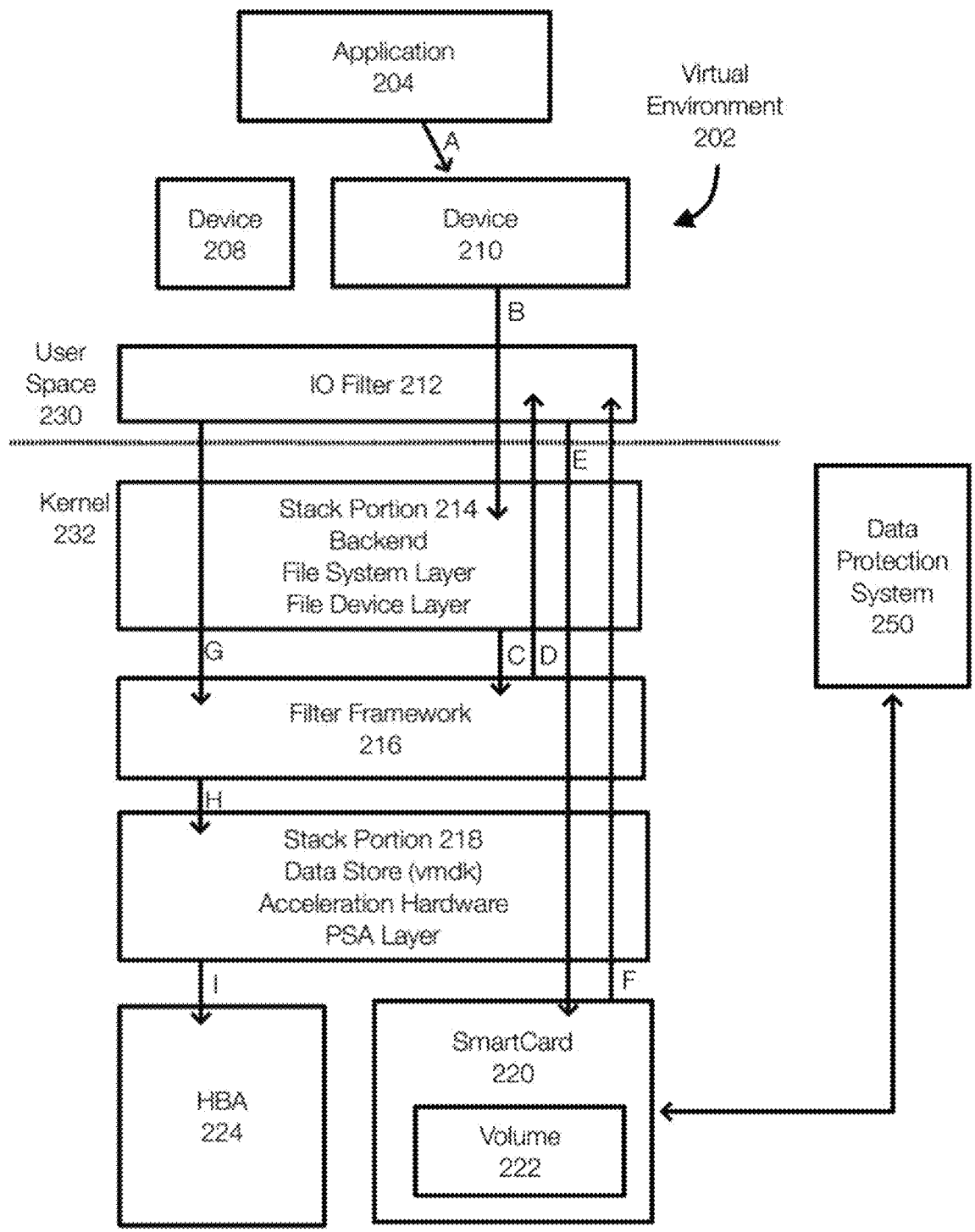
FIG. 2 discloses aspects of a splitter implemented in a virtualized environment.

FIG. 2 discloses aspects of a data protection system including a splitter that may have multiple components. FIG. 2 illustrates the splitter of FIG. 1B in more detail. FIG. 2 illustrates a virtual environment 202. The virtual environment 202 includes a user space 230 and a kernel 232. An application 204 (associated with a virtual machine) operates in the user space 230.

The virtual environment 202 typically includes a stack that is responsible for identifying the physical volume to which a write is sent. The stack may include, by way of example only, an IO filter 212, a stack portion 214, a filter framework 216, and a stack portion 218.

The stack portion 214 may include a device backend such as vSCSI backend (for the device 208 when the device 208 is a vSCSI device) and/or a vNVMe backend (for the device 210 when the device 210 is an vNVMe device), a file system layer, and a file device layer. These layers operate on writes as normal. The stack portion 218 may include a data store (VMDK), acceleration hardware, and a PSA (pluggable Storage Architecture) layer. In this example, an HBA (Host Bust Adapter) 224, and a smartNIC (Network Interface Card) 220 may be included. One of skill in the art can appreciate that a stack, such as an IO stack, may be represented in different ways using different nomenclature and layers and may be implemented in the user space 230 and/or kernel 232.

Generally, the stack illustrated in FIG. 2 is responsible for identifying the physical volume to which a write IO is directed. While moving from the VMFS (Virtual Machine File System) to the PSA (Pluggable Storage Architecture) layer, information about the IO is converted or translated into the physical address location (e.g., volume and offset). At the layer where the HBA (Host Bus Adapter) processes the write, information about the virtual disk is no longer available. This is one reason for implementing the IO filter 212 at a location in the IO stack or hypervisor where virtual information is available. Splitting at the smartNIC 220 may not be efficient because virtual information is no longer available for the write.

For example, the application 204 may perform a write that is associated with the device 210, which may be a vNVMe controller. The write passes from the device 210 to the stack 214 portion, where the write is processed by a device backend, file system layer, and file device layer in one embodiment. Next, the write arrives at the filter framework 216 or is intercepted by the filter framework 216.

The filter framework 216 is an example of a framework that provides flexibility in implementing a splitter. The framework may offer a pluggable framework, for example and the IO filter 212 may be implemented as a plugin to the filter framework.

Splitting the write essentially begins at the filter framework 216. When the write is received at the filter framework 216, the IO filter 212 is invoked and the IO filter 212 adds information about the VMDK and the virtual offset to the write. The augmented write is then provided to the smartNIC 220 by the IO filter 212 without further processing in the stack. After acknowledgment back to the IO filter 212 from the card 220, the normal write processing then continues through the stack 218, which may include data store (VMDK) processing, acceleration hardware, PSA layer processing, or the like. The normal write is then delivered to the HBA 224 and stored in the appropriate physical location.

The smartNIC or card 220 may be provided with a volume 222 that is only exposed or available to the stack. The application 204, for example, is unaware of the volume 222. The IO filter 212, however, recognizes the volume 222 and has access to the volume 222.

Thus, the split write is sent to the card 220 and stored in the volume 222.

When the application 204 performs writes (IOs), the writes may be performed using a device 208 or a device 210 (e.g., vSCSI device or vNVME device). The devices 208 and 210 may be controllers that facilitate IOs in the virtual environment 202. In one example, the devices 208 and 210 are in the user space 230.

The arrows shown in FIG. 2 illustrate an example of the path of a write. The write generated by the application 204 flows at path A to the device 210. At path B, the write flows to and through the stack 214 and arrives via path C at the filter framework 216. The write is then transmitted to the IO filter 212 via path D. The IO filter 212 augments the write and sends the augmented write directly to the smartNIC 220 via path E. An acknowledgement is received by the IO Filter 212 via path F.

Once the acknowledgment is received, the write returns via path G to the filter framework 216 and then goes through path H to the stack 218. The write, which is now physical, is delivered via path 1 to the HBA 224. As previously stated, these communications occur in the stack and have very low latencies. Thus, splitting operations can be performed without or by minimally impacting the performance of a stack such as associated with NVMe.

Figure 3:
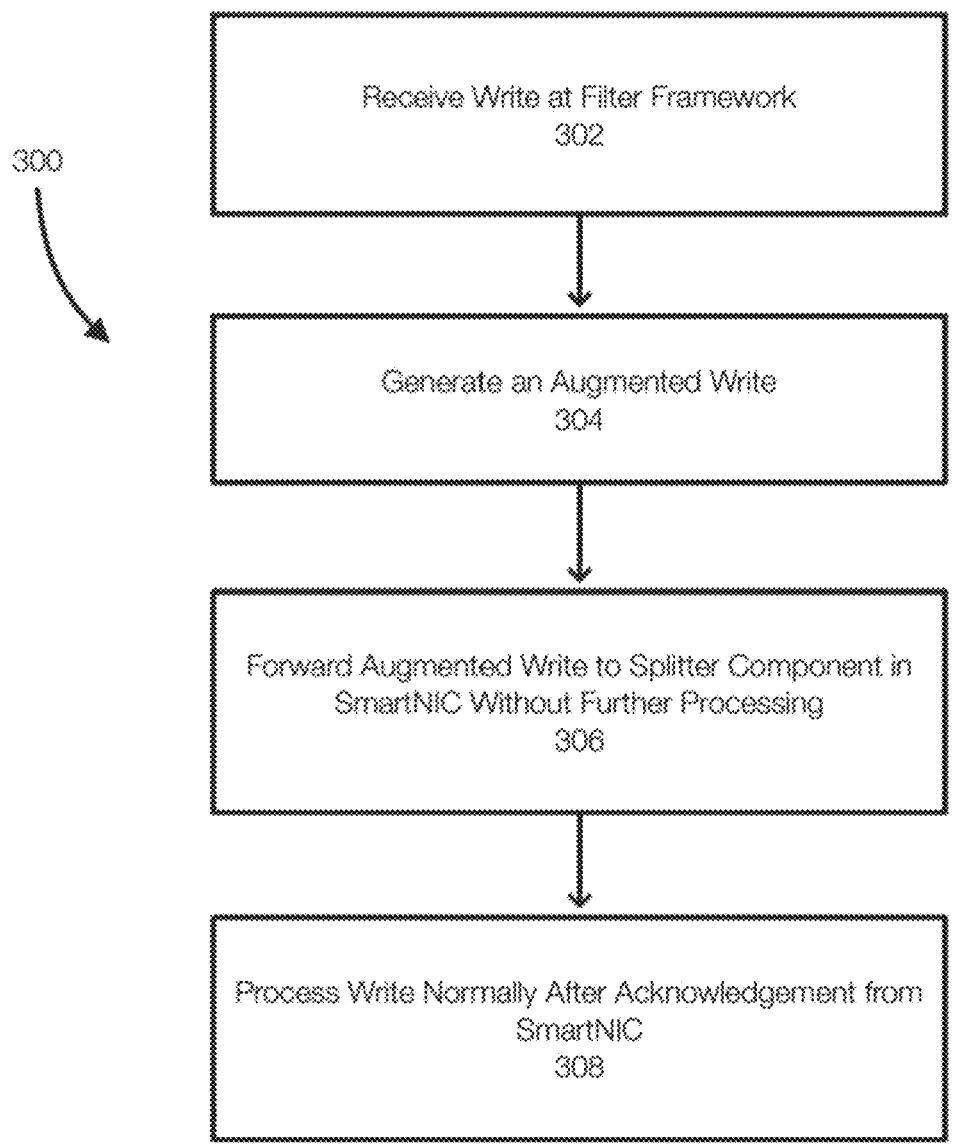
FIG. 3 discloses aspects of splitting a write in a virtualized environment.

FIG. 3 discloses aspects of splitting a write in an environment such as a virtualized environment. In the method 300, a write may receive 302 from an application at a filter framework. The filter framework may be implemented as part of an IO stack in the virtualized environment. When the write is received by the filter framework, an IO filter is invoked and an augmented write is generated 304 by an IO filter. The write is augmented with metadata reflecting information about the VMDK and the virtual offset to which the write is directed.

The augmented write is forwarded 306, by the IO filter, to a splitter component operating on a card such as a smartNIC without further processing the IO stack. The augmented write is a copy of the write generated by the application plus additional metadata that allows the source VMDK to be identified. After receiving an acknowledgement from the smartNIC (or splitter component operating on the smartNIC), the write is processed 308 normally in the rest of the IO stack. This may include determining a physical address for the write to a physical location and writing to the physical disk.

Figure 4:
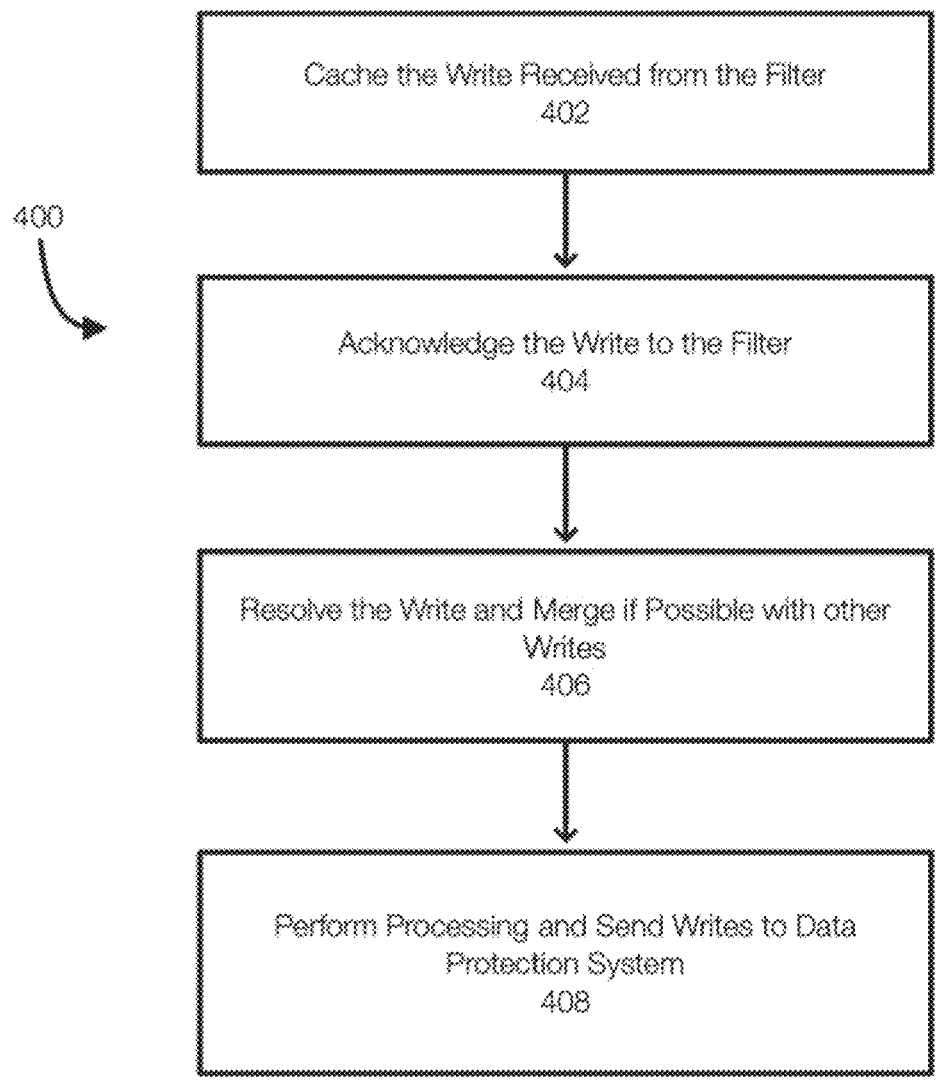
FIG. 4 discloses aspects of processing a write.

FIG. 4 discloses aspects of processing a write that has been forwarded from an IO filter layer or component of an IO stack. In the method 400, a write is received 402 by a splitter component operating on a smartNIC. The write is acknowledged 404 such that the IO stack can continue processing the write in the production system as previously discussed. The write is then resolved 406 and merged with other writes where possible. More specifically, the virtual location or VMDK is resolved or determined from the augmented write. As previously stated, the write was augmented with metadata and the metadata allows the virtual location to be determined. The write is then merged with other writes from the same source VMDK.

Thus, the splitter component operating on the smartNIC can essentially keep track of which writes come from which source VMDKs. This allows the various VMDKs to be replicated or backed up correctly such that an application and its associated VMDKs can be recovered if necessary.

Next, processing is performed 408 and the processed writes may be transmitted to a data protection system such as an RPA. This may be done over the network using, in one example, a different protocol. The processing may include performing compression, deduplication, encryption, etc., on the writes. Once processed, the writes may be batched and transmitted to the data protection system.

When performing the splitting operation and augmenting the write with metadata, the augmenting can be performed in different manners. For example, the volume or component present on the card may have End to End Data Protection configured for the namespace. The PRACT bit may be cleared but namespace will be formatted with protection information. This will allow the protection information to be passed to the below layers.

For example, if the IO filter framework has access to the IO command structure, a new command structure may be created and the Protection Information Format fields to the command structure. The command structure will contain the actual VMDK information and the offset. The rest of the payload will be the same without any changes. Once the splitter component on the card (e.g., component 168 and volume 164 or an NVMe Device) receives the payloads, protection information can be discarded and the payload including the source VMDK information and offset can be stored or cached. The length of the IO would be the same so there be no need no need to transfer that, however the length can be transferred as well.

Figure 5:
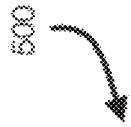
FIG. 5 illustrates protection information field from an NVMe express specification.

The NVMe express specification provides an example, as illustrated in FIG. 5 as definition 500. If the namespace is formatted with protection information and the PRACT bit is cleared to '0', then logical block data and metadata, which contains the protection information and may contain additional metadata, are transferred from the host buffer to NVM (i.e., the metadata field remains the same size in the NVM and the host buffer).

In another example, the metadata added to the augmented write can be transmitted using a shared memory. In this example, a shared memory buffer between the SmartNIC and IO Filter may be shared. Information of the IO including the VMDK ID and offset are placed into the shared memory. The IO can be identified by an ID if it exists or the buffer pointer. In this example, the metadata is placed in the shared memory, by the filter, before the IO reaches the card. The card can retrieve the metadata information from the shared memory and derive the virtual volume and offset information to perform the split operation. Although the metadata information placed in shared memory is sequential and can be placed as fixed sized records in a round-robin fashion, synchronization mechanisms (e.g., locks, etc.) may be added to ensure coherent access.

In another example, fake write commands may be generated. These are fake in the sense that the volume in the card is accessible only to the filter in one example. The filter may create a fake write command (e.g., an NVMe write command) with the original data buffers and with additional information of VMDK ID and offset. The filter driver will send this write command to the volume on the smartNIC. The SmartNIC may cache this IO for further processing and look up the information once the "real" write comes down the stack. Note that due to parallelism there is no guarantee that the fake and real IO will be consecutive. The SmartNIC will need to hold the virtual information in memory until the real IO comes in. Once the IO is processed the virtual information may be removed or discarded.

The splitter mechanisms disclosed herein allow the source VMDK or virtual disk to be identified using a filter framework and to use the smartNIC in a replication solution in a virtualized or containerized environment. Embodiments of the invention allow virtual address to be transferred from the IO stack to the smartNIC. Embodiments of the invention, in addition to operating in virtual environments including virtual machines, may also operating in containerized environments and in FCD (First Class Disks) environments.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations. Such operations may include, but are not limited to, splitting operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

It is noted with respect to the example method of Figure(s) XX that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Following are some further example embodiments of the invention. These are presented only by way of example and are not intended to limit the scope of the invention in anyway.

Embodiment 1. A method, comprising: A method, comprising: receiving a write from an application at a filter framework implemented in an write path of a computing environment, generating an augmented write by adding metadata to the write, wherein the metadata includes information for a source virtual disk of the write, transmitting the augmented write to a splitter component on a network interface card, and processing the write, after receiving an acknowledgment from the splitter component, in the write path such that the write is committed to storage.

Embodiment 2. The method of embodiment 1, invoking a filter to augment the write, wherein the filter is in a user space and the filter framework is in a kernel.

Embodiment 3. The method of embodiment 1 and/or 2, further comprising processing the augmented write at the network interface card, wherein the network interface case is a smart network interface and the processing includes one or more of resolving the write with other writes, compressing the write, deduplicating the write, encrypting the write, batching the write, and transmitting the write to a data protection system over a network.

Embodiment 4. The method of embodiment 1, 2 and/or 3, further comprising adding the metadata using end to end encryption.

Embodiment 5. The method of embodiment 1, 2, 3, and/or 4, further comprising implementing a volume at the network interface card, wherein the volume is only visible to the filter framework, and the filter.

Embodiment 6. The method of embodiment 1, 2, 3, 4, and/or 5, further comprising adding the metadata using a shared memory, wherein the shared memory is shared by the network interface card and the filter.

Embodiment 7. The method of embodiment 1, 2, 3, 4, 5, and/or 6, further comprising adding the metadata using a fake write command to the volume.

Embodiment 8. The method of embodiment 1, 2, 3, 4, 5, 6, and/or 7, further comprising storing the fake write command until the write is received through the write path.

Embodiment 9. The method of embodiment 1, 2, 3, 4, 5, 6, 7, and/or 8, further comprising implementing the filter framework and the filter in a hypervisor or a container management layer.

Embodiment 10. The method of embodiment 1, 2, 3, 4, 5, 6, 7, 8, and/or 9, transmitting the augmented write to the splitter component without further processing of the augmented write in the stack.

Embodiment 11. A method for performing any of the operations, methods, or processes, or any portion of any of these or any combination thereof, disclosed herein.

Embodiment 12. A non-transitory storage medium having stored therein instructions that are executable by one or more hardware processors to perform operations comprising the operations of any one or more of embodiments 1 through 12.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied, by the Figures and/or elsewhere herein, may take the form of, or include, or be implemented on, or hosted by, a physical computing device. As well, where any of the aforementioned elements comprise or consist of a virtual machine (VM), that VM may constitute a virtualization of any combination of the physical components disclosed herein.

In one example, the physical computing device includes a memory which may include one, some, or all, of random access memory (RAM), non-volatile memory (NVM) such as NVRAM for example, read-only memory (ROM), and persistent memory, one or more hardware processors, non-transitory storage media, UI device, and data storage. One or more of the memory components of the physical computing device may take the form of solid state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   receiving a write from an application at a filter framework implemented in a write path of a computing environment;
   generating an augmented write by adding metadata to the write, wherein the metadata includes information for a destination of the write and an offset of the write in the destination;
   transmitting the augmented write to a splitter component on a network interface card, wherein the splitter component is associated with a memory for storing the augmented write;
   processing the augmented write stored in the memory of the network interface card; and
   processing the write in the write path such that the write is committed to storage in the computing environment.

2. The method of claim 1, wherein the destination comprises a virtual disk and an offset of the write in the virtual disk or a container and an offset of the write in the container.

3. The method of claim 1, further comprising invoking a filter to augment the write, wherein the filter framework and the filter are implemented in a hypervisor or a container management layer.

4. The method of claim 1, further comprising processing the augmented write at the network interface card, wherein the network interface card is a smart network interface and the processing includes one or more of resolving the write with other writes, compressing the write, deduplicating the write, encrypting the write, batching the write, and transmitting the write to a data protection system over a network.

5. The method of claim 3, further comprising implementing a volume at the network interface card in the memory, wherein the volume is only visible to the filter framework and/or the filter.

6. The method of claim 5, further comprising adding the metadata using a shared memory, wherein the shared memory is shared by the network interface card and the filter.

7. The method of claim 5, further comprising adding the metadata using a fake write command to the volume and storing the fake write command until the write is received through the write path.

8. The method of claim 1, further comprising transmitting the augmented write to the splitter component without further processing of the augmented write in a write stack.

9. The method of claim 1, further comprising processing the write in the write path after the filter component acknowledges the augmented write to the filter.

10. A non-transitory storage medium having stored therein instructions that are executable by one or more hardware processors to perform operations comprising:
    receiving a write from an application at a filter framework implemented in a write path of a computing environment;

generating an augmented write by adding metadata to the write, wherein the metadata includes information for a destination of the write and an offset of the write in the destination;

transmitting the augmented write to a splitter component on a network interface card, wherein the splitter component is associated with a memory for storing the augmented write;

processing the augmented write stored in the memory of the network interface card; and processing the write in the write path such that the write is committed to storage in the computing environment.

11. The non-transitory storage medium of claim 10, wherein the destination comprises a virtual disk and an offset of the write in the virtual disk or a container and an offset of the write in the container.

12. The non-transitory storage medium of claim 10, further comprising invoking a filter to augment the write, wherein the filter framework and the filter are implemented in a hypervisor or a container management layer.

13. The non-transitory storage medium of claim 10, further comprising processing the augmented write at the network interface card, wherein the network interface card is a smart network interface and the processing includes one or more of resolving the write with other writes, compressing the write, deduplicating the write, encrypting the write, batching the write, and transmitting the write to a data protection system over a network.

14. The non-transitory storage medium of claim 12, further comprising implementing a volume at the network interface card in the memory, wherein the volume is only visible to the filter framework and the filter.

15. The non-transitory storage medium of claim 14, further comprising adding the metadata using a shared memory, wherein the shared memory is shared by the network interface card and the filter.

16. The non-transitory storage medium of claim 14, further comprising adding the metadata using a fake write command to the volume and storing the fake write command until the write is received through the write path.

17. The non-transitory storage medium of claim 10, further comprising transmitting the augmented write to the splitter component without further processing of the augmented write in a write stack.

18. The non-transitory storage medium of claim 10, further comprising processing the write in the write path after the filter component acknowledges the augmented write to the filter.

19. A method comprising:
receiving a write generated by an application at a device, wherein the write flows to a write path to a first write stack portion;

receiving the write at a filter framework in a kernel space, wherein the filter framework initials a process of splitting the write;

transmitting the write to a filter in a user space, wherein the filter generates an augmented write and transmits the augmented write to a network interface card;

after receiving an acknowledgement from the network interface card that the augmented write has been received, transmitting the write to the filter framework, wherein the filter framework passes the write to a second stack portion;

storing the write, which now has a physical address, in a storage device.

20. The method of claim 19, further comprising processing the augmented write at the network interface card, wherein the processing includes one or more of resolving the write with other writes, compressing the write, deduplicating the write, encrypting the write, batching the write, and transmitting the write to a data protection system over a network, wherein the device is controller, and wherein augmenting the write includes adding metadata that includes information for a destination of the write and an offset of the write in the destination.

* * * * *

UNITED STATES PATENT AND TRADEMARK OFFICE
CERTIFICATE OF CORRECTION

PATENT NO. : 12,393,441 B2
APPLICATION NO. : 18/416481
DATED : August 19, 2025
INVENTOR(S) : Jehuda Shemer et al.

Page 1 of 1

It is certified that error appears in the above-identified patent and that said Letters Patent is hereby corrected as shown below:

In the Specification

Column 6
Line 32, change "data protection system" to -- data protection system 250 --

Column 8
Line 56, change "so there be no need no need to transfer that" to -- so there be no need to transfer that --

Signed and Sealed this
Sixteenth Day of December, 2025

John A. Squires
*Director of the United States Patent and Trademark Office*